(12) United States Patent
Anand (10) Patent No.: US 9,343,065 B2
(45) Date of Patent: May 17, 2016

(54) SYSTEM AND METHOD FOR PROCESSING A KEYWORD IDENTIFIER

(71) Applicant: Nitin Dinesh Anand, Irving, TX (US)

(72) Inventor: Nitin Dinesh Anand, Irving, TX (US)

(73) Assignee: Oyokey Inc., Irving, TX (US)

( * ) Notice: Subject to any disclaimer, the term of this patent is extended or adjusted under 35 U.S.C. 154(b) by 0 days.

(21) Appl. No.: 14/318,378

(22) Filed: Jun. 27, 2014

(65) Prior Publication Data
US 2015/0006173 A1 Jan. 1, 2015

Related U.S. Application Data (60) Provisional application No. 61/840,803, filed on Jun. 28, 2013.

(51) Int. Cl.
| | | |
|---|---|---|
| G10L 15/00 | (2013.01) | |
| G10L 15/18 | (2013.01) | |
| G06F 17/27 | (2006.01) | |
| G06F 17/28 | (2006.01) | |
| G10L 15/26 | (2006.01) | |
| G06F 17/30 | (2006.01) | |

(52) U.S. Cl.
CPC .......... *G10L 15/26* (2013.01); *G06F 17/30876* (2013.01)

(58) Field of Classification Search
None
See application file for complete search history.

(56) References Cited

U.S. PATENT DOCUMENTS

| | | | | |
|---|---|---|---|---|
| 7,275,049 | B2 * | 9/2007 | Clausner | G06F 17/30722 706/55 |
| 7,742,922 | B2 * | 6/2010 | Goller | G06F 17/30637 704/235 |
| 7,747,604 | B2 * | 6/2010 | Hawkins | G06F 17/3089 707/709 |
| 7,976,386 | B2 * | 7/2011 | Tran | A63F 13/06 463/1 |
| 8,312,057 | B2 * | 11/2012 | John | G10L 15/22 704/3 |
| 8,503,624 | B2 * | 8/2013 | Shaffer | G06Q 10/107 379/88.01 |
| 8,650,031 | B1 * | 2/2014 | Mamou | G10L 15/08 704/2 |
| 8,849,659 | B2 * | 9/2014 | Tran | G06Q 30/0209 463/39 |
| 2011/0307484 | A1 * | 12/2011 | Anand | G06F 17/30887 707/736 |
| 2013/0301813 | A1 * | 11/2013 | Shaffer | G06Q 10/107 379/88.01 |
| 2014/0101139 | A1 * | 4/2014 | Gemert | G06F 17/30528 707/722 |
| 2014/0136197 | A1 * | 5/2014 | Mamou | G10L 15/08 704/235 |
| 2015/0039679 | A1 * | 2/2015 | Blinn | H04L 67/02 709/203 |

* cited by examiner

*Primary Examiner* — Satwant Singh
(74) *Attorney, Agent, or Firm* — Carter Scholer Arnett Hamada & Mockler, PLLC (57) ABSTRACT

A mobile device for accessing information over a communication network using a keyword identifier. The mobile device comprises: i) transceiver circuitry configured to transmit information to, and receive information, from the communication network; ii) voice recognition circuitry configured to receive from a microphone of the mobile device a voice input spoken by a user of the mobile device and convert the voice input to a text string; and ii) a controller configured to determine if the text string includes a valid keyword identifier. In response to a determination that the text string includes a valid keyword identifier, the controller generates a query from the valid keyword identifier and transmits the query to a remote server. In response to a determination that the text string does not include a valid keyword identifier, the controller identifies in the text string at least one candidate keyword and at least one candidate domain name. The controller transmits the at least one candidate keyword and at least one candidate domain name to a keyword server associated with a keyword management database.

12 Claims, 8 Drawing Sheets

SYSTEM AND METHOD FOR PROCESSING A KEYWORD IDENTIFIER

CROSS-REFERENCE TO RELATED APPLICATION(S) AND CLAIM OF PRIORITY

The present application is related to U.S. Provisional Patent Application No. 61/840,803, which was filed on 28 Jun. 2013 and is entitled "System And Method For Inputting, Detecting And Processing A Keyword". Provisional Patent No. 61/840,803 is assigned to the assignee of the present application and is hereby incorporated by reference into the present application as if fully set forth herein. The present application hereby claims priority under 35 U.S.C. §119(e) to U.S. Provisional Patent No. 61/840,803.

The present application is also related to U.S. patent application Ser. No. 13/066,761, entitled "System And Method Of Addressing And Accessing Information Using A Keyword Identifier" and filed on 25 Apr. 2011, and to U.S. Provisional Patent Application No. 61/397,387, entitled "System And Method Of Addressing And Accessing Information Using A Keyword Identifier And A Keyword Management System" and filed on 11 Jun. 2010. Application Ser. Nos. 13/066,761 and 61/397,387 are assigned to the assignee of the present application and are hereby incorporated by reference into the present application as if fully set forth herein.

TECHNICAL FIELD

The present application relates generally to systems and methods for entering (inputting), detecting, and processing a pattern of a keyword identifier that is input via a keyboard, a scanner, or voice recognition circuitry, such that information or data corresponding to the keyword identifier is rendered at a smartphone or other device where the keyword identifier is entered.

BACKGROUND

Conventional Internet addressing systems restrict the way in which these systems can be used. Some systems (e.g., 2D Bar Codes) require scanning and other systems (e.g., URLs) are difficult to use except by typing on a keyboard. Entering a typical URL on a portable device, via keyboard or voice recognition, may be difficult and time consuming, particularly for a complex URL. For alternate addressing systems for portable devices, such as QR code or mobile visual search, typing or speaking is not an option. These systems are image-based and are limited to using scan-based systems on portable devices. Users cannot type or voice (speak) an image.

Moreover, if URLs are used in voice-based systems, the user must be 100% accurate in speaking the URL, as a slight change in a single character within a URL may not render the correct result. Thus, voice-based systems are impractical except for the simplest URLs. No credible addressing system exists that can accurately access information within voice-based systems.

Therefore, there is a need in the art for improved methods and systems for accessing electronic resources via the Internet. In particular, there is a need for improved methods and systems using voice-recognition technology to access information via the Internet

SUMMARY OF THE INVENTION

To address the problems inherent in the prior art, it is an object to provide a mobile device capable of accessing information over a communication network using a keyword identifier. The mobile device comprises: i) transceiver circuitry configured to transmit information to, and receive information, from the communication network; ii) voice recognition circuitry configured to receive from a microphone of the mobile device a voice input spoken by a user of the mobile device and convert the voice input to a text string; and ii) a controller configured to determine if the text string includes a valid keyword identifier having the form "keyword#domain_name.TLD", wherein the value "keyword" represents a keyword, the value "domain_name" represents a domain name, and the value "TLD" represents a top level domain. In response to a determination that the text string includes a valid keyword identifier, the controller generates a query from the valid keyword identifier and transmits the query to a remote server.

In one embodiment of the disclosure, in response to a determination that the text string does not include a valid keyword identifier, the controller is further configured to identify in the text string at least one candidate keyword and at least one candidate domain name.

In another embodiment of the disclosure, the controller is further configured to transmit the at least one candidate keyword and at least one candidate domain name to a keyword server associated with a keyword management database.

In still anther embodiment of the disclosure, the controller is further configured to receive from the keyword server at least one suitable keyword identifier associated with the at least one candidate keyword and the at least one candidate domain name transmitted to the keyword server.

In yet embodiment of the disclosure, the controller is further configured to display the received at least one suitable keyword identifier on a screen of the mobile device.

In a further embodiment of the disclosure, the controller is further configured to receive a selection from the user of the mobile device selecting a suitable keyword identifier from the at least one suitable keyword identifier displayed on the screen.

In a still further embodiment of the disclosure, the controller is further configured to generate a query from the selected keyword identifier and transmit the query to the remote server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged processing device.

This disclosure relates to various methods and systems of inputting, detecting and processing a keyword identifier (or keytag). The unique pattern or form factor of the keyword identifier is detected by the disclosed systems and methods. Once validated, the keyword identifier is used to get information associated with the keyword identifier or to trigger or initiate a process (e.g., send a text or e-mail, place a voice call) in a device or system.

The keyword identifier is a natural language, keyword-based system for information addressing and accessing that give businesses the ability to associate a keyword identifier to their information. It also gives users the ability to access information associated with the keyword identifier or trigger or initiate a process (e.g., text message, e-mail, voice call) in a device or system, using various modes of input (type, scan and voice) and allows users to easily write and speak the keyword identifier to access information associated with the keyword identifier.

The keyword identifier takes the form "keyword#domain_name.TLD". As shown, it comprises a keyword, followed immediately by the keyboard character "#" (hashtag or hash), followed immediately by a domain name (including first-level domains, mid-level domains and sub-domains), followed immediately by the keyboard character "." (dot or period), followed immediately by a top level domain (TLD), such as "com", "org", "gov", "edu", and the like. The domain name and TLD combination (i.e., "domain_name.TLD") represents an Internet website.

Systems and methods according to the present disclosure detect an input from a keyboard, scanner, or voice-recognition circuit and determine if the input is a valid form of a keyword identifier. The disclosed systems and methods convert the scanned or voiced input into a text string and then determines if the converted text is a valid pattern of the keyword identifier or can be converted into a valid keyword identifier.

The systems and methods can initiate capture of inputted scanned image or voice by detecting various components of the keyword identifier. For example, the disclosed devices may simply detect a "#" (hash) character. Alternatively, the disclosed devices may detect a "#" (hash) character followed by a domain name (first-level domains, mid-level domains and sub-domains) followed by a "." (dot) followed by the top level domain (TLD). Alternatively, the disclosed devices may detect the entire keyword identifier, including the keyword. The disclosed systems and methods may accept any input first and then detect if such an input conforms to the form factor or pattern of a keyword identifier or if the input may be modified to conform to the form factor or pattern of a keyword identifier By way of example, if a person uses a smartphone, the person may use the camera to scan a set of keywords and the disclosed systems and methods may determine if the captured image includes a valid keyword identifier. Alternatively, the person may speak all or parts of a keyword identifier, including the word "hash", and the voice-recognition circuits may convert the input audio signal to a string of alphanumeric characters. The disclosed systems and methods then determine if the string of alphanumeric characters includes a valid keyword identifier.

By way of example, a person may speak a sentence of keywords, which may include parts of a keyword identifier. The disclosed systems and methods then detect these parts and generate a query using these parts. The query may be sent to a remote server to determine if a corresponding keyword identifier may be found in a keyword management database based on the parts of the keyword identifier inputted by the user. Alternatively, a local keyword management database may be stored in the user device so that a remote server is not required to match the parts of the keyword identifier entered by the user. The disclosed systems and methods then generate a query using the detected keyword identifier. This query may then be sent to retrieve information associated with the keyword identifier. The query may be sent to a server associated with an Internet website represented by the domain name and TLD parts of the keyword identifier or to some other computer system. The disclosed systems and methods generate the URL query by following the standard of a URL query. The server may use the generated URL query to return information corresponding to the keyword identifier or trigger or initiate a process in a device or system.

The system generated query may contain the keyword, the # character, the domain name, the TLD, or other information used by the server to determine the resulting information. This resulting information is sent to the portable device of the user that generated and sent the query request. The resulting information is rendered on the portable device.

Figure 1A:
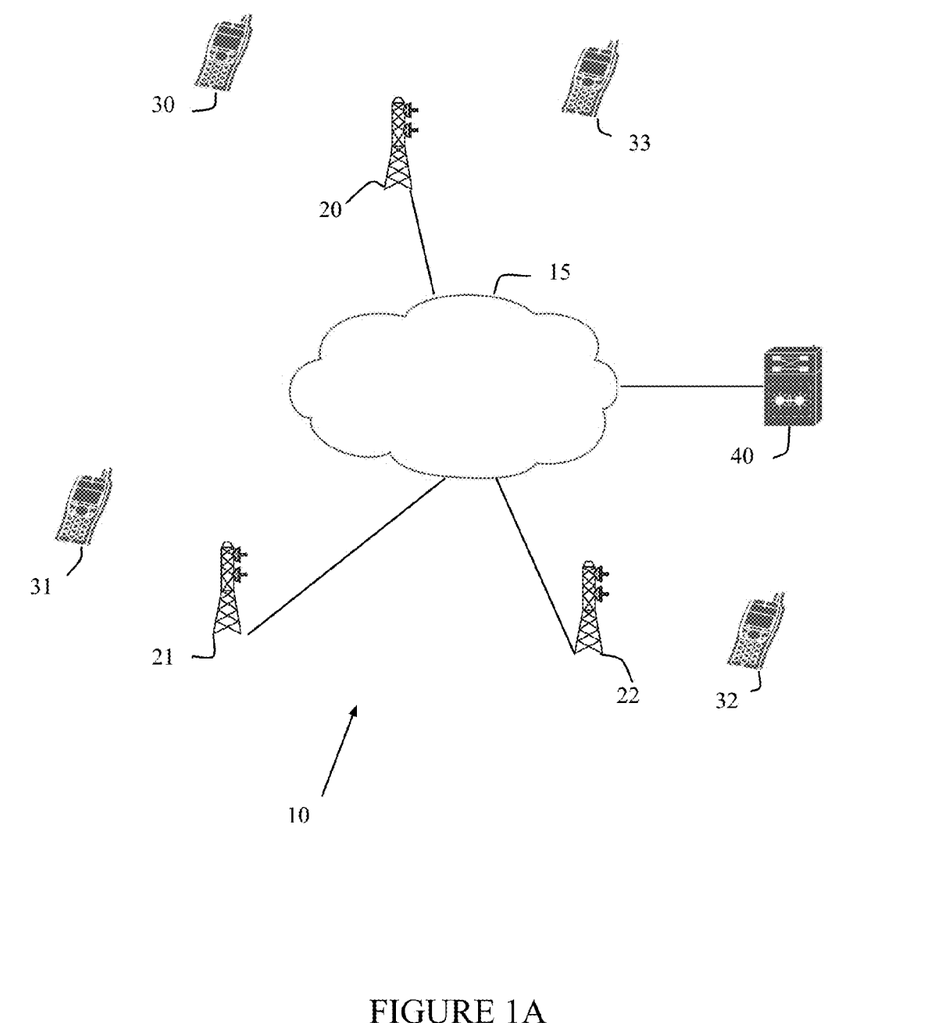
FIG. 1A is a topographical view of a communication network in which the present invention may be implemented.

FIG. 1A is a topographical view of a communication network 10 in which the present invention may be implemented. Communication network 10 comprises Internet protocol network 15 (i.e., the Internet), cell towers 20, 21 and 22, user devices 30, 31, 32, and 33, and keyword server 40. User devices 30 and 33 are in wireless communication with cell tower 20. User device 31 is in wireless communication with cell tower 21. User device 32 is in wireless communication with cell tower 22.

In FIG. 1A, user devices 30-33 are represented as smartphone icons. However, this is by way of example only and should not be construed so as to limit the scope of the present disclosure. In general, each one of user devices 30-33 may be any one of a number of computational and programmable devices, including smartphones, tablet computers, electronic notebooks, personal computers, internet televisions, PIM consoles, laptops, cell phones, standalone terminals with screens for user interaction, on-board transportation systems (e.g., trucks, ships, airplanes, GPS-based navigation systems), network appliances, wearable computing devices and augmented reality devices, such as glasses and watches, pattern and speech recognition devices or any other systems that are capable of connecting to distributed computer networks. However, for the sake of simplicity, the following description will be directed to a mobile smartphone implementation of the present invention.

Figure 1B:
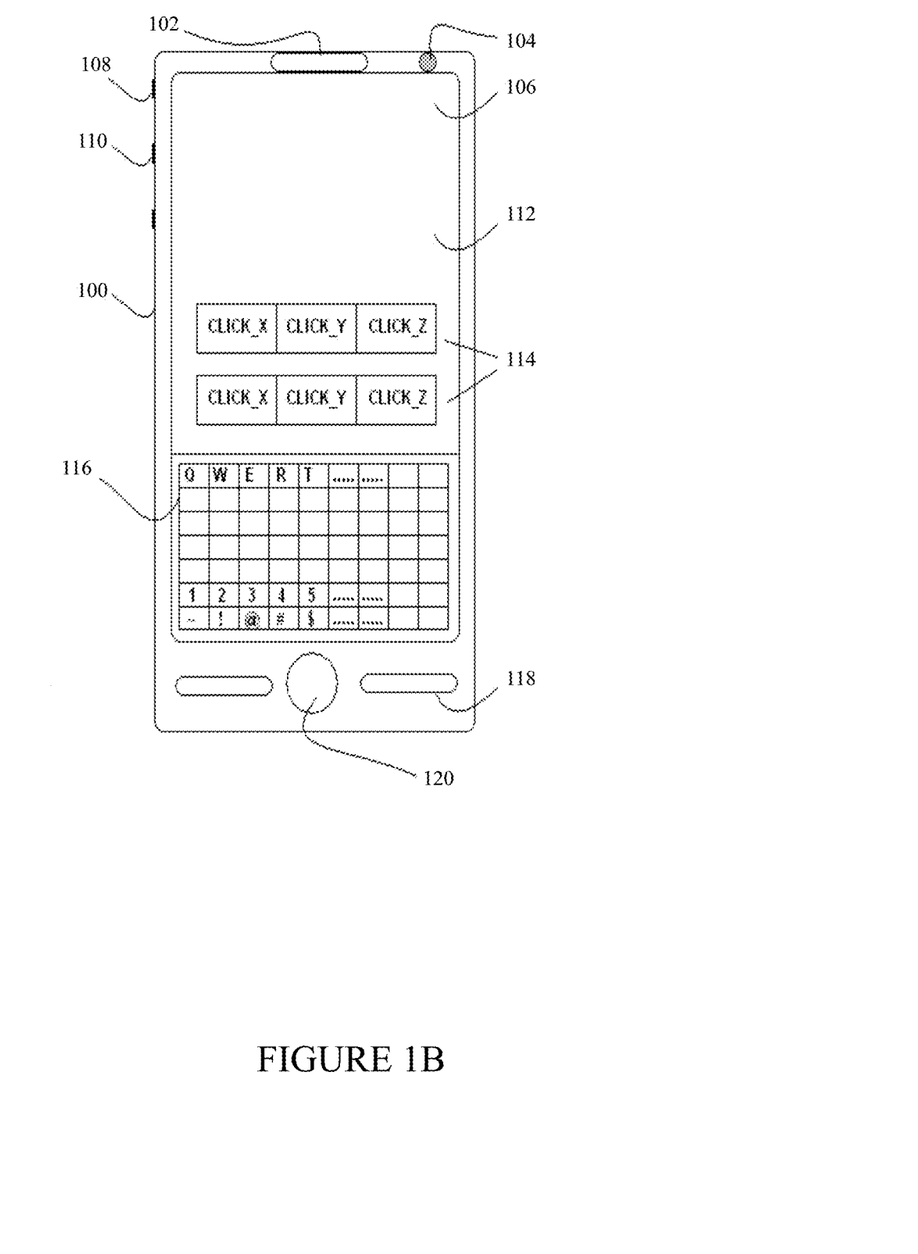
FIG. 1B illustrates an external view of a user device according to one embodiment of the disclosure.

FIG. 1B illustrates an external view of user device 100 according to one embodiment of the disclosure. User device 100 may be any one of user devices 30-32 from FIG. 1A. Device 100 comprises speaker 102, camera 104, display screen 106, ON/OFF button 108, other function button 110, touch-screen circuit 112, on-screen icons 114, keyboard 116, microphone 118, and navigation button 120. Keyboard 116 may be a physical keyboard separate from screen 106 or may be a pop-up keyboard that appears on screen 106 and is operated using touch-screen circuit 112. Device 100 may include many built-in functions and applications that allow the users to interact with device 100 by input methods such as typing, touch, voice, gestures, or actions recognized by cameras built into device 100. These built-in functions or applications use the buttons and icons of device 100 to operate device 100 and execute the application programs stored therein.

Figure 1C:
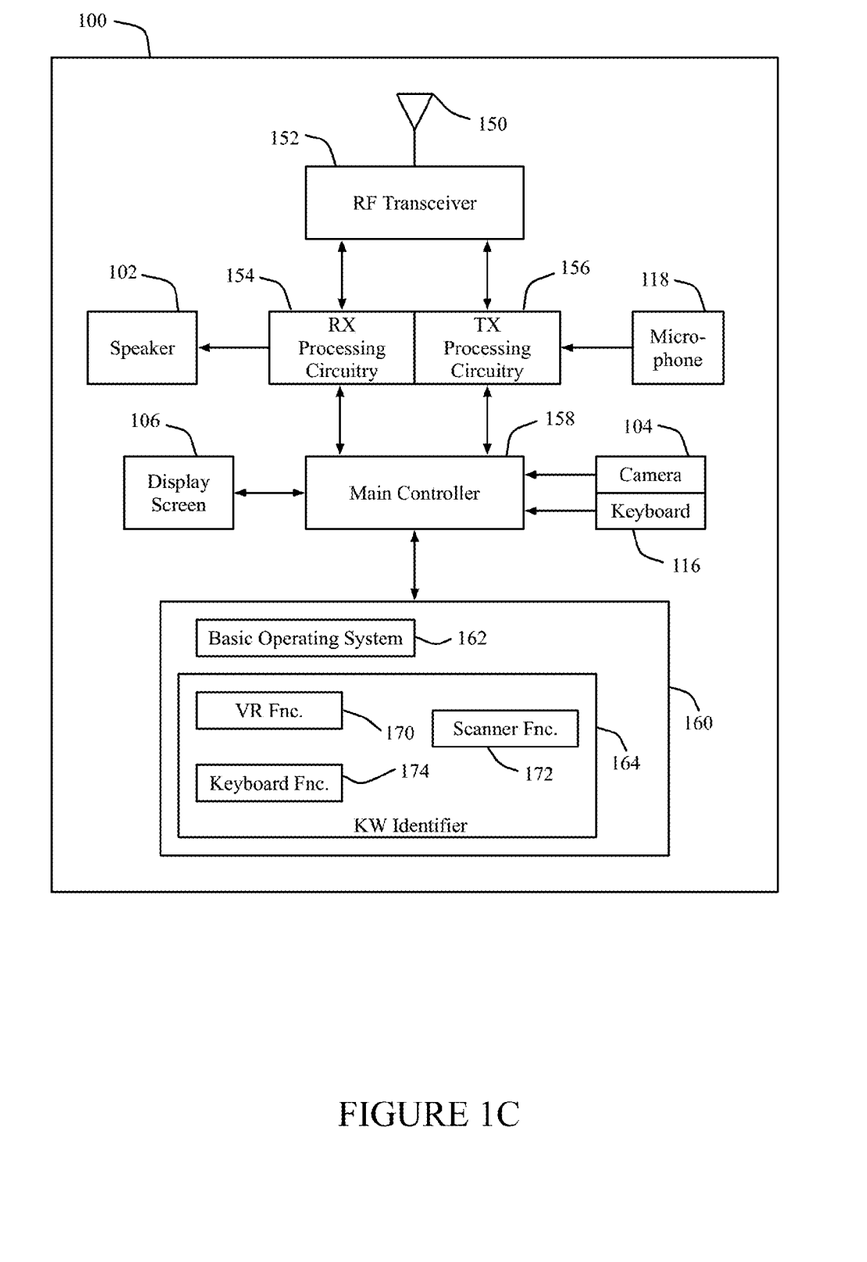
FIG. 1C illustrates a schematic view of a user device according to one embodiment of the disclosure.

FIG. 1C illustrates a schematic view of user device 100 according to one embodiment of the disclosure. In addition to the external components described in FIG. 1A, user device 100 further comprises antenna 150, radio frequency (RF) transceiver 152, receive (RX) processing circuitry 154, transmit (TX) processing circuitry 156, main processor 158, and memory 160. Memory 160 further comprises basic operating system (OS) program 162 and keyword (KW) identifier program 164. KW identifier program 164 may be implemented as firmware that operates as part of basic OS program 162 or may be implemented as an end-user application that is separate from basic OS program 162. KW identifier program 164 further comprises voice recognition (VR) function 170, scan function 172, and keyboard function 174.

RF transceiver 152 receives from antenna 150 an incoming RF signal transmitted by a cell tower of network 10. RF transceiver 152 down-converts the incoming RF signal to produce an intermediate frequency (IF) or a baseband signal. The IF or baseband signal is sent to RX processing circuitry 154 that produces a processed baseband signal by filtering, decoding, and/or digitizing the baseband or IF signal to produce a processed baseband signal. RX processing circuitry 154 transmits the processed baseband signal to speaker 102 (i.e., voice data) or to main controller 158 for further processing (e.g., web browsing).

TX processing circuitry 156 receives analog or digital voice data from microphone 118 or other outgoing baseband data (e.g., web data, e-mail, interactive video game data) from main controller 158. TX processing circuitry 156 encodes, multiplexes, and/or digitizes the outgoing baseband data to produce a processed baseband or IF signal. RF transceiver 152 receives the outgoing processed baseband or IF signal from TX processing circuitry 156 and up-converts the baseband or IF signal to an RF signal that is transmitted via antenna 150.

In an advantageous embodiment of the disclosure, main processor 158 is a microprocessor or microcontroller. Memory 160 is coupled to main controller 158. According to an advantageous embodiment, part of memory 160 comprises a random access memory (RAM) and another part of memory 160 comprises a Flash memory, which acts as a read-only memory (ROM). Main controller 158 executes basic operating system (OS) program 162 stored in memory 160 in order to control the overall operation of device 100. In one such operation, main controller 158 controls the reception of forward channel signals and the transmission of reverse channel signals by RF transceiver 152, RX processing circuitry 154, and TX processing circuitry 156, in accordance with well-known principles.

Main controller 158 is capable of executing other processes and programs resident in memory 160. Main controller 158 can move data into or out of memory 160, as required by an executing process. Main controller 158 is also coupled to keyboard 116 and display screen 106, including touch-screen circuit 112. In accordance with the principles of the present disclosure, main controller 158 is also capable of executing KW identifier program 164, including VR function 170, scan function 172, and keyboard function 174, as described below in greater detail.

Figure 1D:
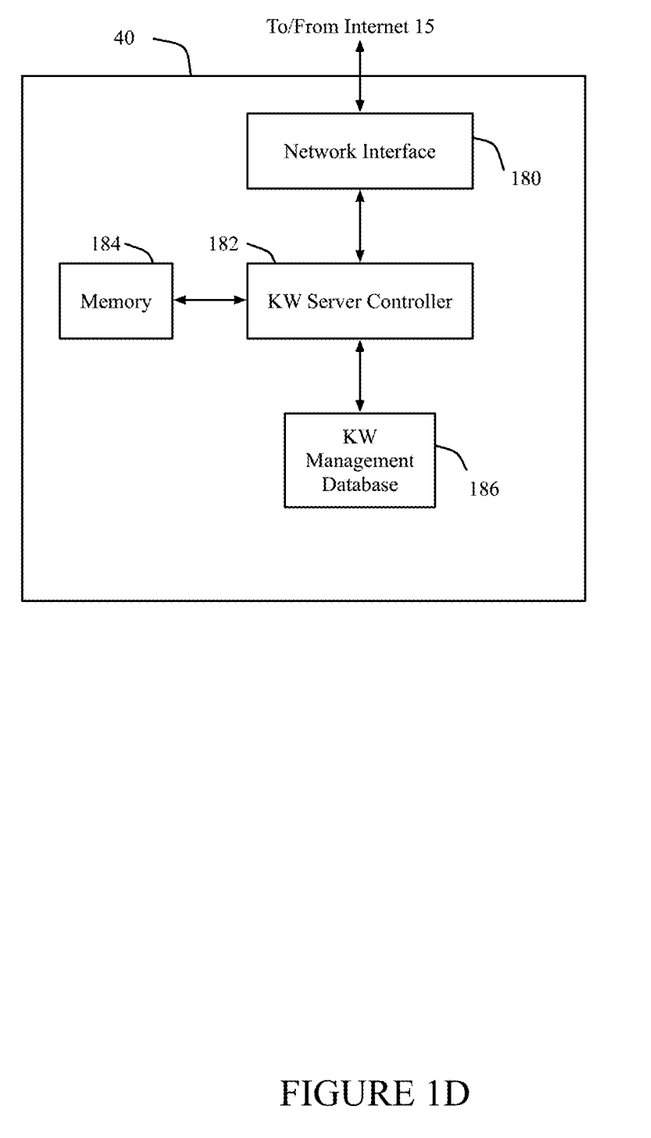
FIG. 1D illustrates a keyword server according to one embodiment of the disclosure.

FIG. 1D illustrates keyword server 40 according to one embodiment of the disclosure. Keyword server 40 comprises network interface 180, keyword (KW) server controller 182, memory 184, and keyword management database 186. Memory 184 comprises a basic operating system program (not shown) and other applications. In an advantageous embodiment, KW server controller 182 is a microprocessor or microcontroller that executes the basic operating system program stored in memory 184 in order to control the overall operation of keyword server 40, including managing and controlling access to keywords, domain names, keyword identifiers and other related information stored in KW management database 186.

Figure 2:
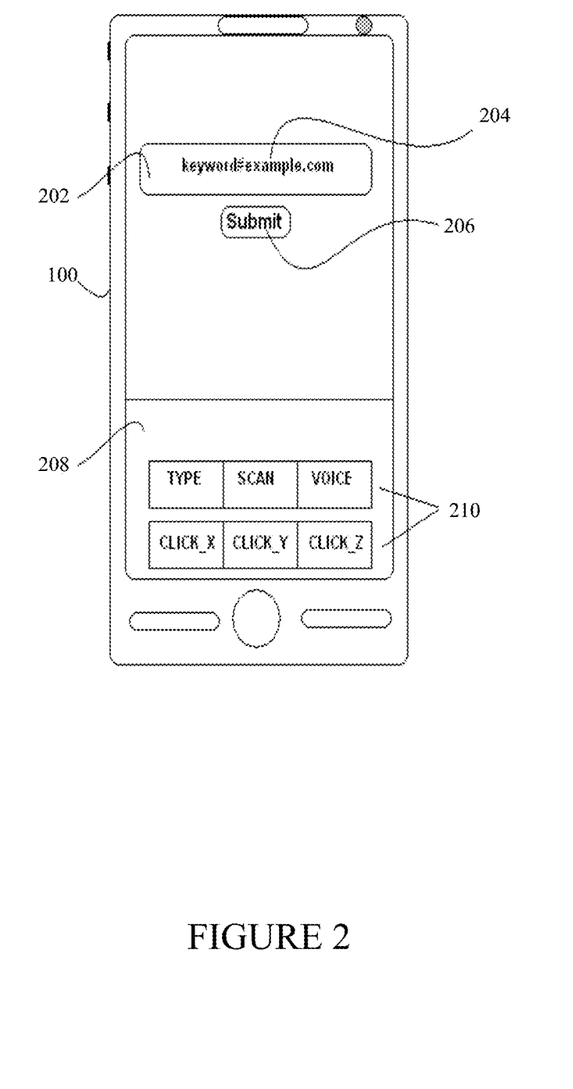
FIG. 2 illustrates an external view of a user device when a keyword is entered using a keyboard according to one embodiment of the disclosure.

FIG. 2 illustrates an external view of user device 100 when a keyword is entered using a keyboard according to one embodiment of the disclosure. In FIG. 2, it is assumed that a pop-up keyboard as described above in FIG. 1B has already been used to enter a keyword identifier in a text box. For simplicity, the virtual keyboard is not shown in FIG. 2. Main controller 158 executes KW identifier program 164, including keyboard function 174, to receive keyword identifier 204 that a user manually enters and displays the entered text into text box 202. As explained above, keyword identifier 204 may be entered by physical keyboard 116 or by virtual keyboard 116 that appears in area 208 of screen 106 and is operated by touch screen circuit 112. Keyword identifier 204 (e.g., keyword#example.com) and text box 202 may be accessed and controlled by button icon 206 and icons 210. These buttons and icons may be used to type on keyboard 116, to exit the application, and to view settings for device 100.

When a user inputs keyword identifier 204 in text box 202 and wants to instruct user device 100 and keyword server 40 to process keyword identifier 204, a text-to-query process is triggered pressing the "Submit" (or "Enter") icon 206. The text-to-query process detects keyword identifier 204 by determining, extracting, and validating keyword identifier 204. Main controller 158, under control of KW identifier program 164, detects keyword identifier 204 by detecting the format of a keyword, followed immediately by "#" character, followed immediately by a domain name, followed immediately by a "." character, followed immediately by a top level domain (TLD) value.

When main controller 158 determines that the inputted text is a valid form of keyword identifier 204 or contains a valid keyword identifier, the keyword identifier part of the inputted text is then converted from text to a query format by main controller 158. If the user-entered text does not conform to the pattern of a keyword identifier, main controller 158 processes the inputted text further to determine if the entered text may be formatted into a valid keyword identifier or a keyword identifier exists that is similar to the entered text. By way of example, even in the absence of a "#" character, main controller 158 may detect a valid domain name in the entered text and may identify a keyword that is identical to or similar to a valid keyword associated with the valid domain name. In such an operation, main controller 158 may communicate with keyword server 40 to identify valid domain names and valid keywords in KW management database 186.

The formatted query is then sent either to the domain name designated by the "domain_name" part of keyword identifier 204 or to keyword server 40. The URL or other information that is associated with keyword identifier 204 is returned to user device 100 and is displayed on screen 116. The formatted query received by either the domain name server designated by the "domain_name" part of keyword identifier 204 or keyword server 40 is usable to perform an internal search based on the variables received through the query. If the domain name server or keyword server 40 does not have an exact match to keyword identifier 204, the domain name server or keyword server 40 may send one or more similar keyword identifiers back to device 100 to allow the user to select an appropriate keyword identifier 204.

Figure 3:
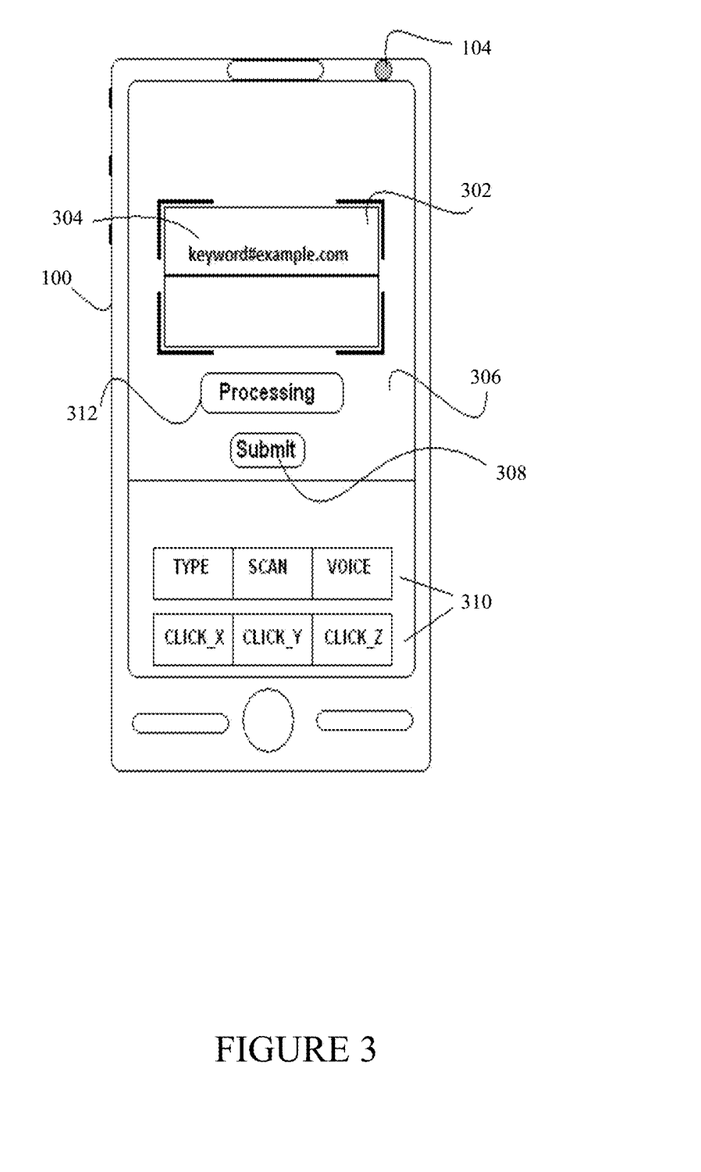
FIG. 3 illustrates an external view of a user device when a keyword is entered using a scan function according to one embodiment of the disclosure.

FIG. 3 illustrates an external view of user device 100 when a keyword is entered using a scanner function according to one embodiment of the disclosure. Main controller 158 executes KW identifier program 164, including scanner function 172, to receive keyword identifier 304 that a user scans using camera 104 and displays scanned keyword identifier 304 in scanner frame 302. Main controller 158 performs the capturing, storing, and processing of the captured image. The user operates button icons 308, 310, and 312 in area 306 of screen 116 to start and to operate KW identifier program 164 and scanner function 172 for scanning keyword identifier 304.

When the user focuses camera 104 to position scanner frame 302 and scans keyword identifier 304, one or more frames of the image of keyword identifier 304 are captured, stored, and processed by main controller 158. Once captured keyword identifier 304 is placed within scanner frame 302, an image-to-query process is triggered pressing the "Submit" button icon 308. Main controller 158 may use one or more frames of the images taken by camera 104 to execute the image-to-query process.

Various methods may be used to capture and process the images of keyword identifier 304. These methods may include detecting a partial pattern (e.g., # character) of keyword identifier 304. If a partial pattern of keyword identifier 304 is detected, main controller 158 may trigger the process of capturing and storing the image of keyword identifier 304 for more extensive processing. Another method that main controller 158 may perform is to focus on the image placed in scanner frame 302. Once the keyword identifier 304 image is in focus, main controller 158 may trigger the capture and storage of the images of keyword identifier 304, which will be used for further processing. In this case, validation of the partial form of keyword identifier 304 is not done and it is assumed that the image captured is more likely to contain a keyword identifier. Another method that can be used is to have the user focus on the image placed in scanner frame 302 and manually trigger the capture of an image of keyword identifier 304.

The image-to-query process detects keyword identifier 304 by converting, extracting and validating the keyword identifier. Main controller 158 first converts the captured image to text using a optical character recognition (OCR) function that is part of scanner function 172. Once the text containing keyword identifier 304 is obtained, main controller 158 determines if keyword identifier 304 comprises a keyword, followed immediately by a "#" character, followed immediately by a domain name, followed immediately by a "." character, followed immediately by a top level domain (TLD) value. Main controller 158 then extracts and validates keyword identifier 304 from the converted text by splitting the keyword identifier into individual parts.

Main controller 158 then transforms the converted text from text to query as described above with respect to FIG. 2. If the converted text does not conform to the pattern of a keyword identifier, main controller 158 may determine if the converted text can be created into a keyword identifier that is similar to the converted text. The query is then sent either to the domain name server designated by the domain name part of keyword identifier 304 or to keyword server 40. The URL or other information that is associated with keyword identifier 304 is returned to user device 100 and is displayed on screen 116. As before, if the domain name server or keyword server 40 does not have an exact match to keyword identifier 304, the domain name server or keyword server 40 may send one or more similar keyword identifiers back to device 100 to allow the user to select an appropriate keyword identifier 304.

Figure 4:
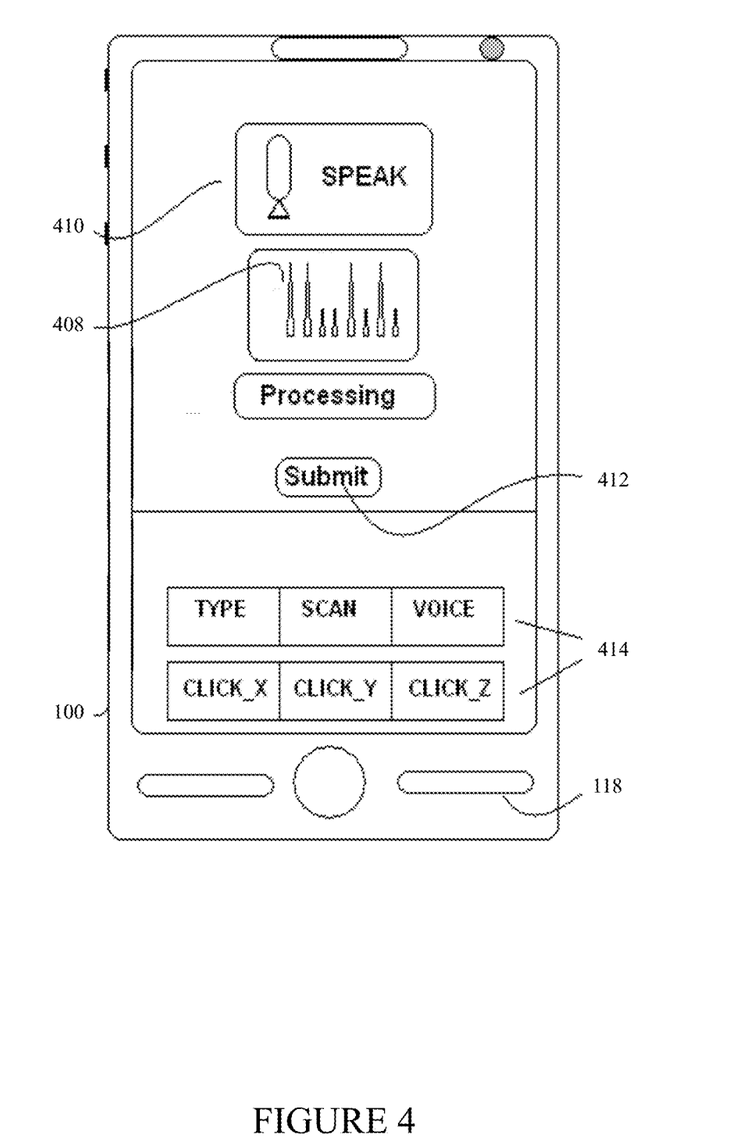
FIG. 4 illustrates an external view of a user device when a keyword is entered using a voice recognition function according to one embodiment of the disclosure.

FIG. 4 illustrates an external view of user device 100 when keywords are entered using voice recognition (VR) function 170 according to one embodiment of the disclosure. Main controller 158 executes KW identifier program 164, including VR function 170, to receive a keyword identifier (not shown) that a user speaks into microphone 118. Main controller 158 performs the capturing, storing, and processing of the captured audio data. The user operates button icons 412 and 414 on screen 116 to start and to operate KW identifier program 164 and VR function 170 for recording a spoken keyword identifier.

Main controller 158 controls the recording, storing, and processing of voice input from the user. When a user speaks the keyword identifier (e.g., keyword#example.com), main controller 158 records the spoken keyword identifier. Main controller 158 may record, store, and process the entire speech of the user or only that part of the speech that may contain a keyword identifier. Once the recording of the speech is initiated, main controller 158 performs a speech-to-query that processes the speech containing the keyword identifier. This execution of this process may be indicated by icon 408.

The speech-to-query process detects the keyword identifier by converting to text and then extracting and validating the keyword identifier. Main controller 158 first converts the speech to text. Once the text containing the keyword identifier is obtained, main controller 158 detects if converted text contains a keyword identifier comprising a keyword, followed immediately by a "#" character, followed immediately by a domain name, followed immediately by a "." character, followed immediately by a top level domain (TLD) value. If main controller 158 determines the converted text from the recorded speech is a valid form of keyword identifier, main controller 158 transforms the keyword identifier part of the converted text from voice date to a query format.

If the converted text does not conform to the pattern of a keyword identifier, main controller 158 may determine if the converted text can be created into a keyword identifier that is similar to the converted text. The query is then sent either to the domain name server designated by the domain name part of the spoken keyword identifier or to keyword server 40. The URL or other information that is associated with spoken keyword identifier is returned to user device 100 and is displayed on screen 116. As before, if the domain name server or keyword server 40 does not have an exact match to the spoken keyword identifier, the domain name server or keyword server 40 may send one or more similar keyword identifiers back to device 100 to allow the user to select an appropriate keyword identifier.

Figure 5:
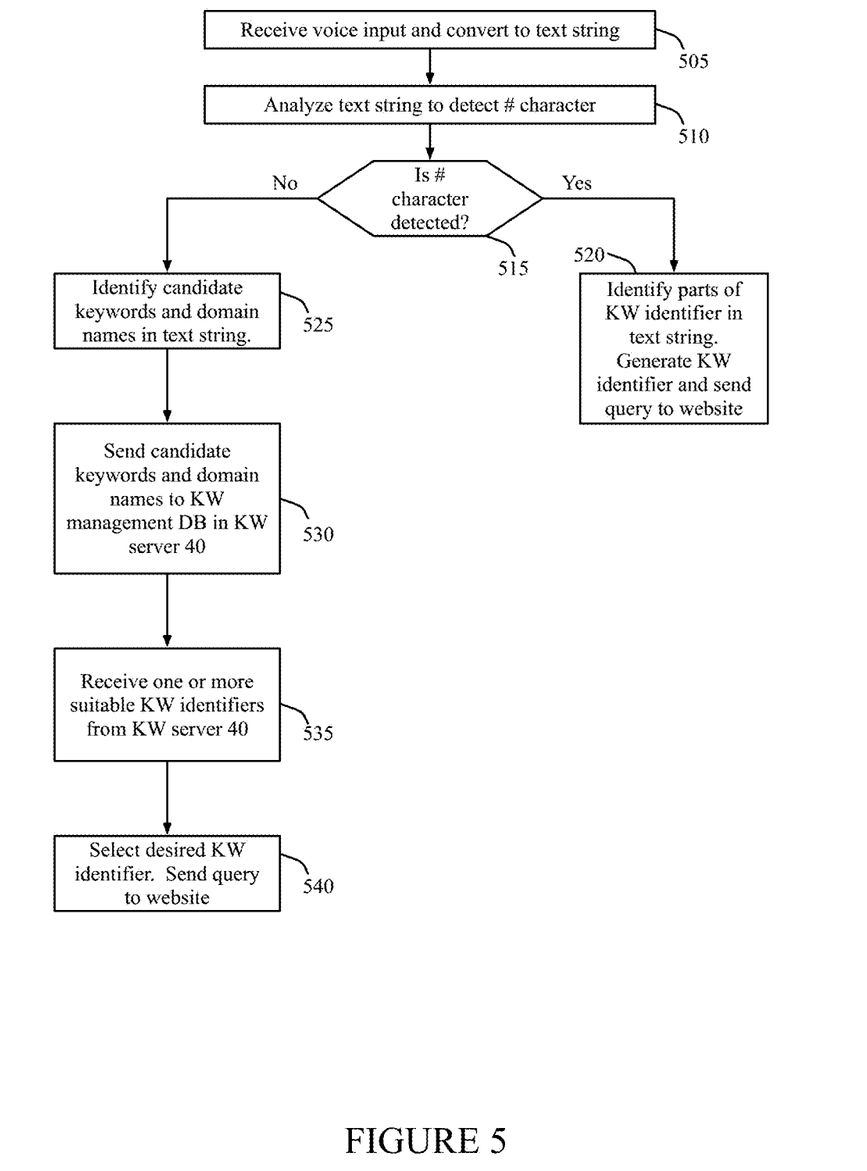
FIG. 5 illustrates a method of entering a keyword using a voice recognition function according to one embodiment of the disclosure.

FIG. 5 illustrates a method of entering a keyword using a voice recognition function according to one embodiment of the disclosure. A user may not speak clearly or may speak the KW identifier elements out of order. The method in FIG. 5 provides flexibility to enable the user device 100 and keyword server 40 to make best-guess estimates about the intended keyword identifier. By way of example, a user may say the words "Find BigStore.com smartphone sales" into device 100, rather than "smartphones#BigStore.com". An advantageous embodiment of the disclosure enables device 100 to find and retrieve several candidate keyword identifiers from which the user may selected the intended one.

Initially, device 100 receives a voice input (i.e., audio input) from the user and, using conventional voice recognition circuitry and algorithms, converts the voice input to a text string of alphanumeric characters (step 505). Next, main controller 158 analyzes the text string to see if a # character was properly received (step 510). If a # character was detected (Yes in step 515), main controller 158 may assume that a keyword identifier was properly entered and may identify in the text string the other parts of the keyword identifier (i.e., keyword, domain name, dot, TLD). Main controller 158 then generates the complete keyword identifier (i.e., "smartphones#BigStore.com) and sends a query to keyword server 40 or to the website server for "BigStore.com" (step 520). Even if the user speaks the keyword identifier out of order (e.g, "BigStore.com#smartphones"), main controller 158 is normally capable of identifying the domain name and at least one keyword and re-ordering the keyword components to the correct format. This may be done with the assistance of keyword server 40.

If a "#" character is not detected (No in step 515), main controller 158 may identify one or more candidate domain names and one or more candidate keywords in the text string (step 525). For instance, main controller 158 may determine that "BigStore" and "smartphones" are potential domain names and may determine that "sales" and "smartphones" are potential keywords. Main controller 158 may then send the candidate keywords and domain names to KW management database 186 in keyword server 40 (step 530).

Next, device 100 may receive from keyword server 40 one or more suitable KW identifiers that match the candidate keywords and domain names (step 535). By way of example, keyword server 40 may return "smartphones#BigStore.com" and "sales#BigStore.com", as well as "sales#smartphones.com". Main controller 158 then displays the options to the user, who selects the intended keyword identifier. Main controller 158 then generates a query and sends the query to keyword server 40 or to the server associated with the domain name (step 540).

As noted above, in an alternate embodiment, user device 100 may comprise a local keyword management database in memory 160 that contains a list of valid keyword identifiers. Instead of transmitting the candidate keywords and candidate domain names to KW management database 186 in keyword server 40, main controller 158 may instead match the parts of the keyword identifier spoken by the user to valid keyword identifiers in the local KW management database. Main controller 158 may then match one or more suitable KW identifiers to the candidate keywords and domain names.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device capable of accessing information over a communication network using a keyword identifier, the mobile device comprising:
   transceiver circuitry configured to transmit information to, and receive information, from the communication network;
   voice recognition circuitry configured to receive from a microphone of the mobile device a voice input spoken by a user of the mobile device and convert the voice input to a text string;
   a computer processor configured to execute computer instructions; and
   a keyword identifier application comprising computer instructions executable by the computer processor, wherein the computer processor is configured to:
   establish a communication link between the mobile device and a proprietary keyword server associated with the keyword identifier application;
   determine if the text string includes a valid keyword identifier having the form 'keyword#domain_name.TLD', wherein the 'keyword' field represents a potential keyword, the 'domain_name' field represents a potential domain_name, the ' TLD' field represents a Top Level Domain; and the "#" field is the hash key character used as a separator between the 'keyword' field and the 'domain_name' field;
   in response to a determination that the text string includes a valid keyword identifier, transmit the keyword identifier to the proprietary keyword server; and
   in response to a determination that the text string does not include a valid keyword identifier, the computer processor is further configured to identify in the text string at least one candidate keyword and at least one candidate domain name.

2. The mobile device as set forth in claim 1, wherein the computer processor is further configured to transmit the at least one candidate keyword and at least one candidate domain name to the proprietary keyword server.

3. The mobile device as set forth in claim 2, wherein the computer processor is further configured to receive from the proprietary keyword server at least one suitable keyword identifier or electronic resource associated with the at least one candidate keyword and the at least one candidate domain name transmitted to the proprietary keyword server.

4. The mobile device as set forth in claim 3, wherein the computer processor is further configured to display the received at least one suitable keyword identifier or electronic resource on a screen of the mobile device.

5. The mobile device as set forth in claim 4, wherein the computer processor is further configured to receive a selection from the user of the mobile device selecting a suitable keyword identifier or electronic resource from the at least one suitable keyword identifier or electronic resource displayed on the screen.

6. The mobile device as set forth in claim 5, wherein the computer processor is further configured to generate a query from the selected keyword identifier and transmit the query to the proprietary keyword server.

7. For use in a mobile device, a method of accessing information over a communication network using a keyword identifier, the method comprising:
- receiving from a microphone of the mobile device a voice input spoken by a user of the mobile device;
- converting the voice input to a text string;
- establishing a communication link between the mobile device and a proprietary keyword server associated with a keyword identifier application executed by the mobile device;
- determining if the text string includes a valid keyword identifier having the form 'keyword#domain_name.TLD', wherein the 'keyword' field represents a potential keyword, the 'domain_name' field represents a potential domain name, the ' TLD' field represents a Top Level Domain; and the "#" field is the hash key character used as a separator between the 'keyword' field and the 'domain_name' field;
- in response to a determination that the text string includes a valid keyword identifier, transmitting the keyword identifier to the proprietary keyword server; and
- in response to a determination that the text string does not include a valid keyword identifier, identifying in the text string at least one candidate keyword and at least one candidate domain name.

8. The method as set forth in claim 7, further comprising:
- transmitting the at least one candidate keyword and at least one candidate domain name to the proprietary keyword server.

9. The method as set forth in claim 8, further comprising:
- receiving from the proprietary keyword server at least one suitable keyword identifier or electronic resource associated with the at least one candidate keyword and the at least one candidate domain name transmitted to the proprietary keyword server.

10. The method as set forth in claim 9, further comprising:
- displaying the received at least one suitable keyword identifier or electronic resource on a screen of the mobile device.

11. The method as set forth in claim 10, further comprising:
- receiving a selection from the user of the mobile device selecting a suitable keyword identifier or electronic resource from the at least one suitable keyword identifier or electronic resource displayed on the screen.

12. The method as set forth in claim 11, further comprising:
- generating a query from the selected keyword identifier; and
- transmitting the query to the proprietary keyword server.

* * * * *